(12) United States Patent
Zuther

(10) Patent No.: US 9,638,506 B2
(45) Date of Patent: May 2, 2017

(54) WRENCH SELECTOR SYSTEM

(71) Applicant: Zane Z. Zuther, Bismarck, ND (US)

(72) Inventor: Zane Z. Zuther, Bismarck, ND (US)

( * ) Notice: Subject to any disclaimer, the term of this patent is extended or adjusted under 35 U.S.C. 154(b) by 196 days.

(21) Appl. No.: 14/613,533

(22) Filed: Feb. 4, 2015

(65) Prior Publication Data

US 2016/0223312 A1 Aug. 4, 2016

(51) Int. Cl.
*G01B 3/24* (2006.01)
(52) U.S. Cl.
CPC ...................................... *G01B 3/24* (2013.01)
(58) Field of Classification Search
CPC .......................................................... G01B 3/24
USPC .......................................... 33/783, 785, 805
See application file for complete search history.

(56) References Cited

U.S. PATENT DOCUMENTS

| | | | | |
|---|---|---|---|---|
| 5,056,238 | A | * | 10/1991 | Chi .......................... G01B 3/563 33/532 |
| 5,430,954 | A | * | 7/1995 | Best ...................... A61B 5/0053 33/784 |
| 5,548,903 | A | | 8/1996 | Johnson |
| 6,223,136 | B1 | | 4/2001 | Geiger |
| 6,508,012 | B2 | | 1/2003 | Wells, Jr. |
| 7,013,763 | B2 | | 3/2006 | Hsien |
| 7,246,450 | B1 | | 7/2007 | Mason |
| 7,373,735 | B2 | | 5/2008 | Jacobs |
| 8,024,869 | B2 | | 9/2011 | Duarte |
| 8,166,836 | B2 | | 5/2012 | Rudduck |
| 2002/0083613 | A1 | | 7/2002 | Wells, Jr. |
| 2007/0157484 | A1 | | 7/2007 | Grubler |
| 2007/0294904 | A1 | | 12/2007 | Jacobs |
| 2008/0184582 | A1 | * | 8/2008 | Kim ........................ G01B 3/205 33/784 |
| 2011/0119946 | A1 | | 5/2011 | Duarte |
| 2013/0067760 | A1 | * | 3/2013 | Husted ..................... G01B 3/24 33/784 |
| 2016/0169654 | A1 | * | 6/2016 | Howard ................... G01B 3/20 33/783 |

OTHER PUBLICATIONS

PCT International Search Report and Written Opinion Received for PCT/US15/30314; Received and Printed on Oct. 19, 2015.

* cited by examiner

*Primary Examiner* — G. Bradley Bennett
(74) *Attorney, Agent, or Firm* — Neustel Law Offices; Michael S. Neustel

(57) ABSTRACT

A wrench selector system for efficiently selecting a wrench based on the head size of a fastener or nut. The wrench selector system generally includes: a housing including a display unit; first and second prongs protruding from said housing, wherein first and second grippings are adjoined to said first and second prongs, respectively; and a control button positioned on said first gripping to allow for holding and computing of at least one of a head size of a fastener or nut; wherein said computing is displayed on said display unit.

20 Claims, 12 Drawing Sheets

| Difference in 1/1000s of an inch | Size in Inches | Standard SAE Wrench Size (inches) | Metric Wrench Size (mm) | Notes - compares Standard and Metric wrench sizes (where they MATCH, and where they don't - wrench equivalence) |
|---|---|---|---|---|
| 14 | 0.236 |  | 6 |  |
| 26 | 0.250 | 1/4 |  |  |
| 6 | 0.276 |  | 7 |  |
| 31 | 0.281 | 9/32 |  |  |
| 2 | 0.313 | 5/16 |  | Close enough (5/16 and 8mm) |
| 29 | 0.315 |  | 8 | |
| 11 | 0.344 | 11/32 |  |  |
| 21 | 0.354 |  | 9 |  |
| 19 | 0.375 | 3/8 |  |  |
| 13 | 0.394 |  | 10 |  |
| 27 | 0.406 | 13/32 |  |  |
| 4 | 0.433 |  | 11 | Close enough (7/16 and 11mm) |
| 31 | 0.438 | 7/16 |  | |

FIG. 11a

| | | | | |
|---|---|---|---|---|
| 4 | 0.469 | 15/32 | | Close enough (15/32 and 12mm) |
| 28 | 0.472 | | 12 | |
| 12 | 0.500 | 1/2 | | |
| 19 | 0.512 | | 13 | |
| 20 | 0.531 | 17/32 | | |
| 11 | 0.551 | | 14 | Close enough (9/16)* |
| 28 | 0.563 | 9/16 | | Close enough (14mm)* |
| 3 | 0.591 | | 15 | Close enough (19/32 and 15mm) |
| 31 | 0.594 | 19/32 | Bicycle | |
| 5 | 0.625 | 5/8 | | |
| 26 | 0.630 | Bicycle | 16 | |
| 13 | 0.656 | 21/32 | | |
| 18 | 0.669 | | 17 | |
| 21 | 0.688 | 11/16 | | |
| 10 | 0.709 | | 18 | |
| 29 | 0.719 | 23/32 | | |
| 2 | 0.748 | | 19 | Close enough (3/4 and 19mm) |

FIG. 11b

| | | | | |
|---|---|---|---|---|
| 31 | 0.750 | 3/4 | | |
| 6 | 0.781 | 25/32 | | |
| 25 | 0.787 | | 20 | |
| 14 | 0.813 | 13/16 | | |
| 17 | 0.827 | | 21 | |
| 22 | 0.844 | 27/32 | | |
| 9 | 0.866 | | 22 | |
| 31 | 0.875 | 7/8 | | |
| 1 | 0.9055 | | 23 | Close enough (29/32 and 23mm) |
| 31 | 0.9063 | 29/32 | | |
| 7 | 0.938 | 15/16 | | |
| 55 | 0.945 | | 24 | |
| | | | 25 | |
| 24 | 1.000 | 1 | 25.40 | |

FIG. 11c

| | | | | |
|---|---|---|---|---|
| 38 | 1.024 | | 26 | |
| 1 | 1.062 | 1 1/16 | 26.99 | |
| 39 | 1.063 | | 27 | |
| 23 | 1.102 | | 28 | |
| 16 | 1.125 | 1 1/8 | 28.58 | |
| 40 | 1.141 | | 29 | |
| 6 | 1.181 | | 30 | |
| 33 | 1.187 | 1 3/16 | 30.16 | |
| 3 | 1.220 | | 31 | |
| 9 | 1.25 | 1 1/4 | 31.75 | |
| 237 | 1.259 | | 32 | |
| 4 | 1.496 | | 38 | |
| 35 | 1.5 | 1 1/2 | 38.10 | |
| 43 | 1.535 | | 39 | |
| x | 1.968 | | 50 | |

FIG. 11d

WRENCH SELECTOR SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

Field of the Invention

The present invention relates generally to wrench selection and more specifically it relates to a wrench selector system for efficiently selecting a wrench based on the head size of a fastener or nut.

Description of the Related Art

Any discussion of the related art throughout the specification should in no way be considered as an admission that such related art is widely known or forms part of common general knowledge in the field.

On-the-go professional mechanics or other sophisticated operators work with several tools concurrently in every environment imaginable. Accordingly, these individuals require tools that not only work quickly and accurately for their purposes, but are designed to make their work easier and more comfortable.

One common problem that mechanics face on a daily basis is to determine which size wrench (e.g. a socket wrench) to use for a particular nut or bolt head. A solution to this issue is the trial and error method where the mechanic guesses the appropriate size by trying out several wrenches to determine the exactly fitting wrench. For obvious reasons, this process is both cumbersome and time-consuming. Professional mechanics may save significant time and avoid delays in their work if there was a toolbox product that could quickly, accurately, and easily provide the necessary information in determining the appropriate wrench for use.

Another solution to overcome these issues is to use an electronic caliper. While electronic calipers can provide a measurement for a particular nut or bolt head, these products do not provide sizes of a corresponding wrench such as a conventional wrench or socket wrench. Moreover, existing electronic calipers are of large and difficult to manage proportions. Known calipers include ruler-like bodies with relatively small "jaws" (to hold the particular nut or bolt head in place) in comparison to relatively large handles. Moreover, known calipers generally have shapes where the jaws are positioned in a perpendicular manner from the handle; therefore taking up a relatively large amount of space.

While such devices are suitable for certain circumstances, these caliper devices are difficult or, often times, impossible to use when trying to reach and measure nuts and bolt heads in "hard to reach" and confined areas. Furthermore, these calipers are cumbersome for professional mechanics who are often juggling numerous portable tools when completing projects.

Because of the inherent problems with the related art, there is a need for a new and improved wrench selector system for efficiently selecting a wrench based on the head size of a fastener or nut.

BRIEF SUMMARY OF THE INVENTION

The invention generally relates to a wrench selector system which includes: a housing including a display unit; first and second prongs protruding from said housing, wherein first and second grippings are adjoined to said first and second prongs, respectively; and a control button positioned on said first gripping to allow for holding and computing of at least one of a head size of a fastener or nut; wherein said computing is displayed on said display unit. Advantageously, the present invention allows for seamless work flow for a mechanic where guesswork is no longer necessary to locate the proper wrench.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIGS. 11a, 11b, 11c and 11d illustrate an example wrench conversion table in accordance with embodiments of the present invention.

DETAILED DESCRIPTION OF THE INVENTION

Figure 1:
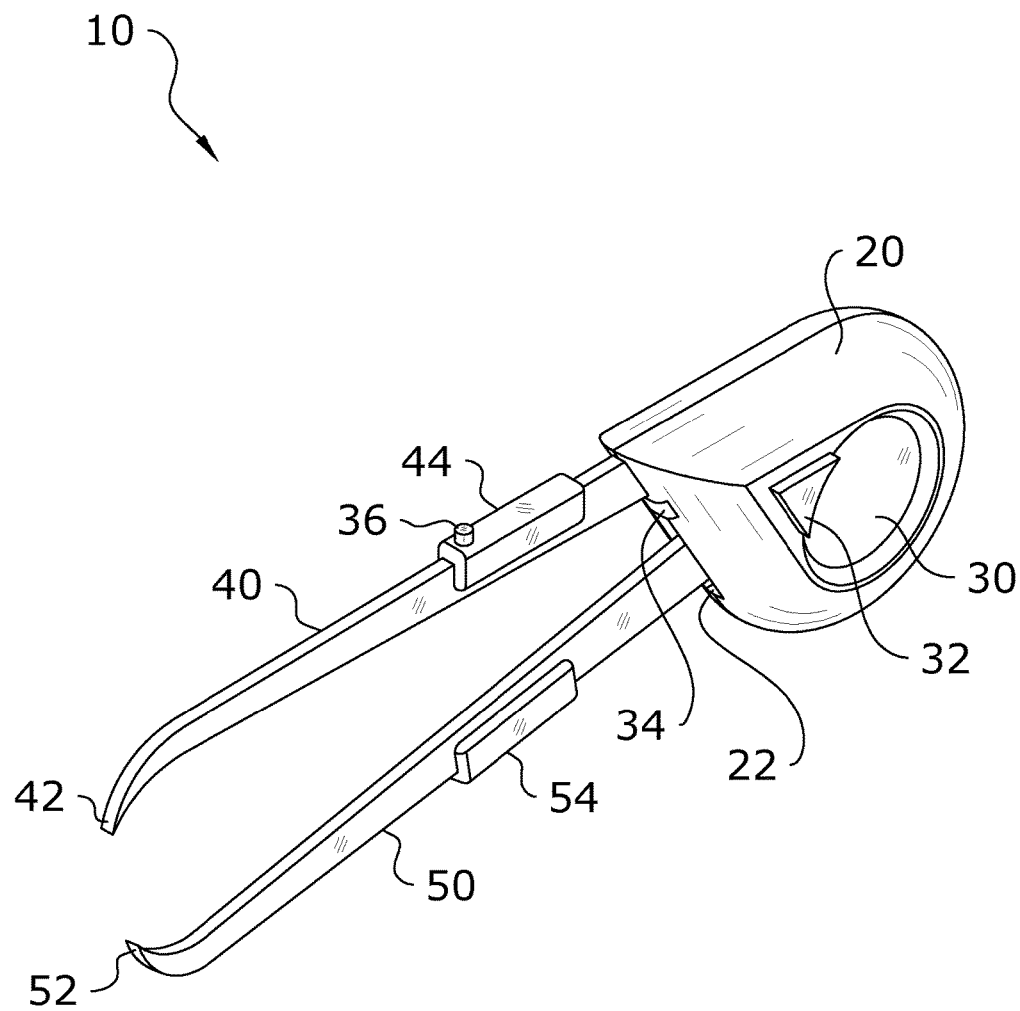
FIG. 1 is an outer perspective view in accordance with embodiments of the present invention.

Turning now descriptively to the drawings, in which similar reference characters denote similar elements throughout the several views, FIGS. 1 through 11 illustrate a wrench selector system (10), which comprises: a housing including a display unit; first and second prongs protruding from said housing, wherein first and second grippings are adjoined to said first and second prongs, respectively; and a control button positioned on said first gripping to allow for computing of at least one of a head size of a fastener or nut; wherein said computing is displayed on said display unit.

Example embodiments of the present invention include a digital electronic wrench selector system (10). The wrench selector system (10) (hereinafter "inventive device" or "device") enables mechanics (hereinafter "operator") to conveniently and efficiently grasp and measure a particular fastener head or nut and determine the appropriate corresponding wrench for use with the said fastener or nut. Advantageously, the present invention not only measures a fastener head or bolt head width, but further utilizes the width measurement to determine a proper size wrench, and displays the wrench sizes in either metric (i.e. millimeters) and/or English (i.e. inches) units on a display unit. For example, in certain embodiments, the inventive device may display wrench sizes between ¼" and 1½" or 6 mm and 39 mm. The measurement information may displayed using any conventional display technology including, but not limited to LCD, OLED, or electrophoretic displays.

FIG. 1 illustrates an outer perspective of the wrench selector system (10) in accordance with embodiments of the present invention. As shown in FIG. 1, an example outer perspective of the wrench selector system (10) includes: a housing (20), first and second prongs (40, 50), first and second grippings (44, 54), a display unit (30), a display button (32), a control button (36), a light (34), and a slot (22).

In embodiments, first and second prongs (40, 50) include a first and second end (42, 52), respectively. While the present invention includes first and second prongs (40, 50), in example embodiments, it is expressly envisioned that these prongs (40, 50) may also be referred to and defined as: tongs, forceps, nippers, pincers, grippers, or appendages. Advantageously, prongs (40, 50) allow for more efficient grasping capabilities due to the prongs (40, 50) elongated, narrow (i.e. thin) and lengthy proportions (i.e. dimensions, diameter, size, etc.) especially in comparison to the proportions (i.e. dimensions, diameter, size, etc.) of the housing (20) (or body of the inventive device (10).

In example embodiments, the display button (32) is located upon and adjoined to the housing (20). For convenience in use and simplicity in design, the display button (32) may be situated adjacent to the display unit (30). Advantageously, display button (32) operates to turn the inventive device "ON", "OFF", and to "ZERO" (or recalibrate) the device.

In example embodiments, housing (20) at least partially encases the display unit (30). Advantageously, due to the partial encasement, the display unit (30) is protected from damage or scratches during usage in difficult to reach and confined areas. Furthermore, housing (20) includes a fixed size rectangular shaped opening which forms a slot (22). In embodiments, the slot (22) is located on a flat side portion of the perimeter of the housing (20).

In example embodiments, first prong (40) is an appendage that extends outward from the perimeter of housing (20) in a fixed and permanent position at a fixed and predetermined length equivalent (or approximately equivalent) to second prong (50). In embodiments, the predetermined length of the first prong (40) appendage concludes at the first end (42) where the first end (42) curves downward to form the top seizing element.

In example embodiments, second prong (50) is an appendage that extends outward from the slot (22) in a varying position at a fixed and predetermined length equivalent (or approximately equivalent) to first prong (40). The second prong (50) is located below the first prong (40), where it is slidably adjustable. Accordingly, second prong (50) can slidably move upward or downward between the slot (22) in a direction. In embodiments, the predetermined length of the second prong (50) appendage concludes at the second end (52) where the second end (52) curves upward to form the bottom seizing element.

In certain embodiments, light (34) is located on top of the slot (22). The light (34) is positioned within the housing (20) but has a displayable portion on the outer perimeter surface of the housing (20). In embodiments, light (34) can be a light emitting diode (LED) or any other light source known in the art. The light (34) is preferably turned on only when the display button (32) is pressed to turn on the device and is automatically turned off after a period of time (e.g. after 30 seconds). The light illuminates the area where the prongs will engage to illuminate the object to be measured. The light (34) may also be turned off by the user manually turning off the device via the control button (32).

For ease, comfort, and stability in use, first and second grippings (44, 54) allow for an operator to hold the inventive device in place so that proper measurement can be performed. First and second grippings (44, 54) are located on outer portions of the first and second prongs (40, 50), respectively. In embodiments, first and second grippings (44, 54) may at least partially wrap around a portion of first and second prongs, respectively. In embodiments, the first and second grippings (44, 54) along with the housing (20) form the "handle" of the inventive device (10).

Advantageously, in embodiments, an operator can contract the second prong (50) by applying force and holding the second gripping (54). In certain embodiments, a spring-like mechanism is located inside the housing allows slidable movement of the second prong (50) through the slot (22), and accordingly the contraction and expansion of the first and second prongs (40, 50).

Advantageously, the housing is shaped in a half circle—half triangle shape design. This unique shape allows for ease in holding the inventive device (10) by an operator, who can operate the inventive device (10) using just one hand. Moreover, the compact half circle—half triangle proportions also aids in allowing for the inventive device (10) to be used in "hard to reach" and confined areas.

Figure 2:
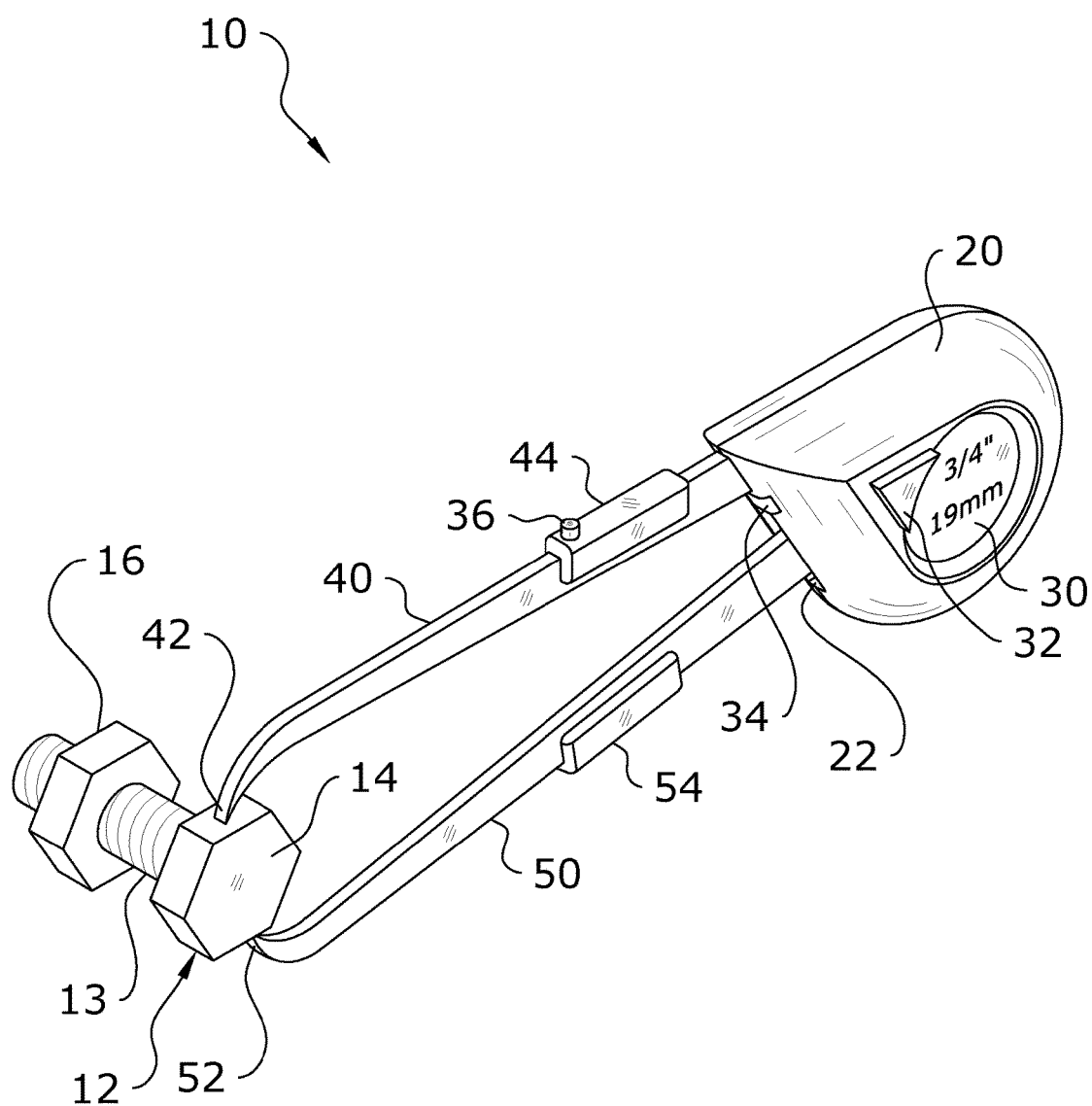
FIG. 2 is an outer perspective view in accordance with embodiments of the present invention.

FIG. 2 illustrates an outer perspective view of the present invention. In FIG. 2, an aspect of an example operation of the inventive wrench selector system is shown. As shown in FIG. 2, first and second ends (42, 52) of first and second prongs (40, 50) respectively, act in concert on opposite sides to hold the head (14) of fastener (12) in place for accurate measurement of the size of an example fastener (12).

Also illustrated in FIG. 2, fastener (12) is shown to include a head (14) and threaded shaft (13) where a nut (16) is threaded onto the threaded shaft (13) of the fastener (12). The position of an example fastener (12) extends horizontally and in an approximately perpendicular position to that of the inventive wrench selector system (10).

Concurrently or shortly after appropriate measurement of the example fastener (12) is conducted, the size of the fastener head (14) is computed, and the corresponding size (in metric and/or English units) of an appropriate wrench is displayed on the display unit (30).

Figure 3:
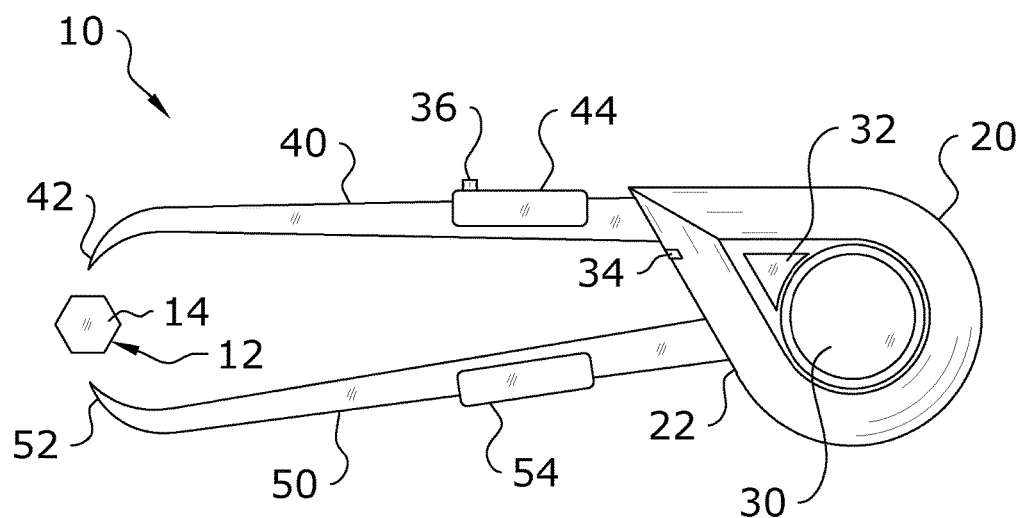
FIG. 3 is a side perspective view in accordance with embodiments of the present invention.
Figure 4:
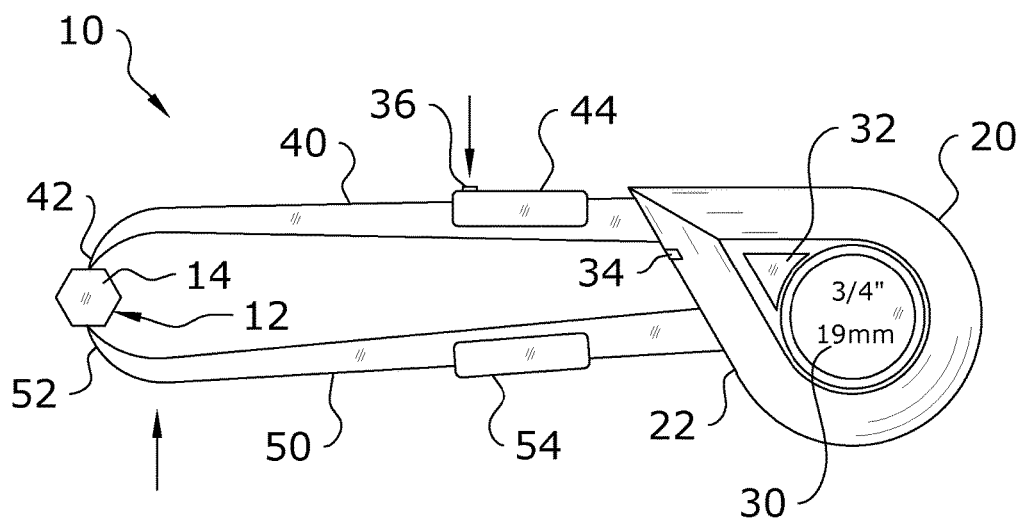
FIG. 4 is a side perspective view in accordance with embodiments of the present invention.

FIGS. 3 and 4 are side perspective views of the present invention. From the side perspective only the head (14) of the fastener (12) is seen. In operation, in FIG. 3, the fastener is placed between to the first and second ends (42, 52) of the prongs (40, 50), which are then contracted (in FIG. 4) to rest on flat areas of the fastener (12).

Figure 5:
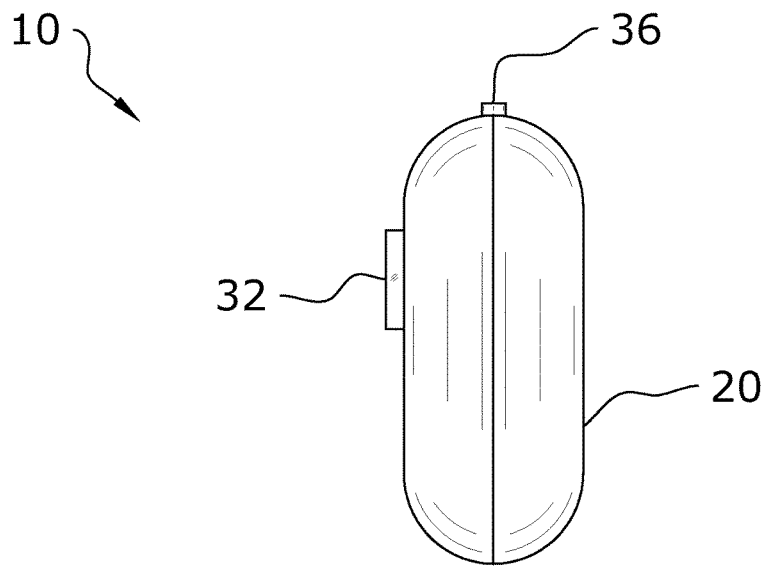
FIG. 5 is a back perspective view in accordance with embodiments of the present invention.
Figure 6:
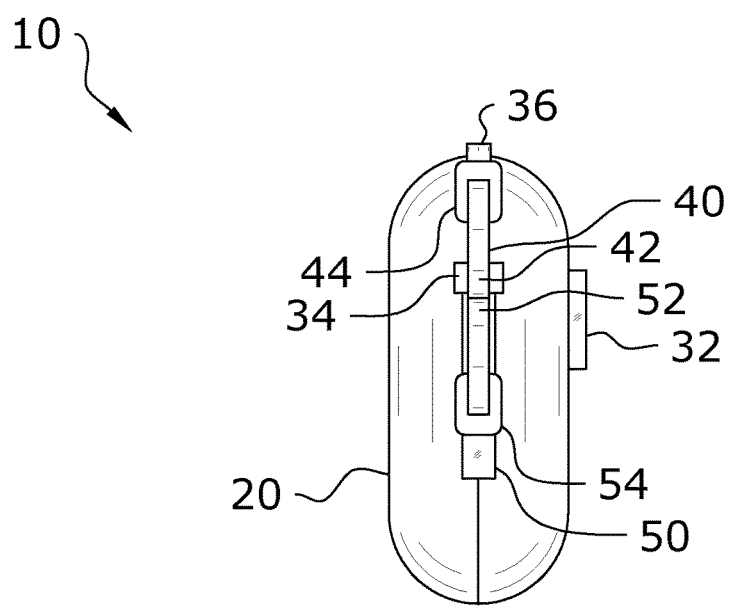
FIG. 6 is a front perspective view in accordance with embodiments of the present invention.

In embodiments, as shown in FIG. 4, when the inventive device (10) is in the contracted position where the fastener (12) is held, an operator presses the control button (36) and the inventive device (1) subsequently computes the size of the fastener to display the corresponding size (in both English and metric units) of an appropriate wrench on the display unit (30). In other embodiments, the display unit (30) may display both the size of the fastener as well as the corresponding size of the appropriate socket FIG. 5 is a back perspective view of the present invention and FIG. 6 is the front perspective view of the present invention. As shown in FIG. 5, only the housing (20) and display and control buttons (32, 36) are noticeable from the back perspective. For comfort and efficient use by operators, the display button (32) is the only button that protrudes from the housing (20). As shown in FIG. 6, the control button is the only button that protrudes from the first prong (40). The display button is located on the upper left side portion of the inventive device (10) on the housing (20), and the control button (36) is located on the top central portion of the device (10) on one end of the first gripping (44) of the first prong (40). Advantageously, in this manner, operators can use the present inventive device (10) with just one hand and not have to devote greater attention or even look at the inventive device (10) for initial operation.

Nevertheless, in other embodiments, the inventive device (10) contemplates the location of the display button (32) on various other portions of the housing (20) including: the upper right side portion of the housing (20), the lower right side portion of the housing (20), and the lower right side portion of the housing (20).

Moreover, in other embodiments, the inventive device (10) contemplates the location of the control button (36) on various other portions of the inventive device including: the bottom central portion of the device (10) on the second gripping (54) of the second prong (50).

As shown in FIGS. 1, 2, 3, 4, and 6, light (34) is located between the first and second prongs (40, 50). Advantageously, in dark locations or during the night, light (34) can aid in the proper operation of the inventive device when it would be difficult to properly position an example fastener (12). In embodiments, light (34) can be a super bright light emitting diode (LED).

Figure 7:
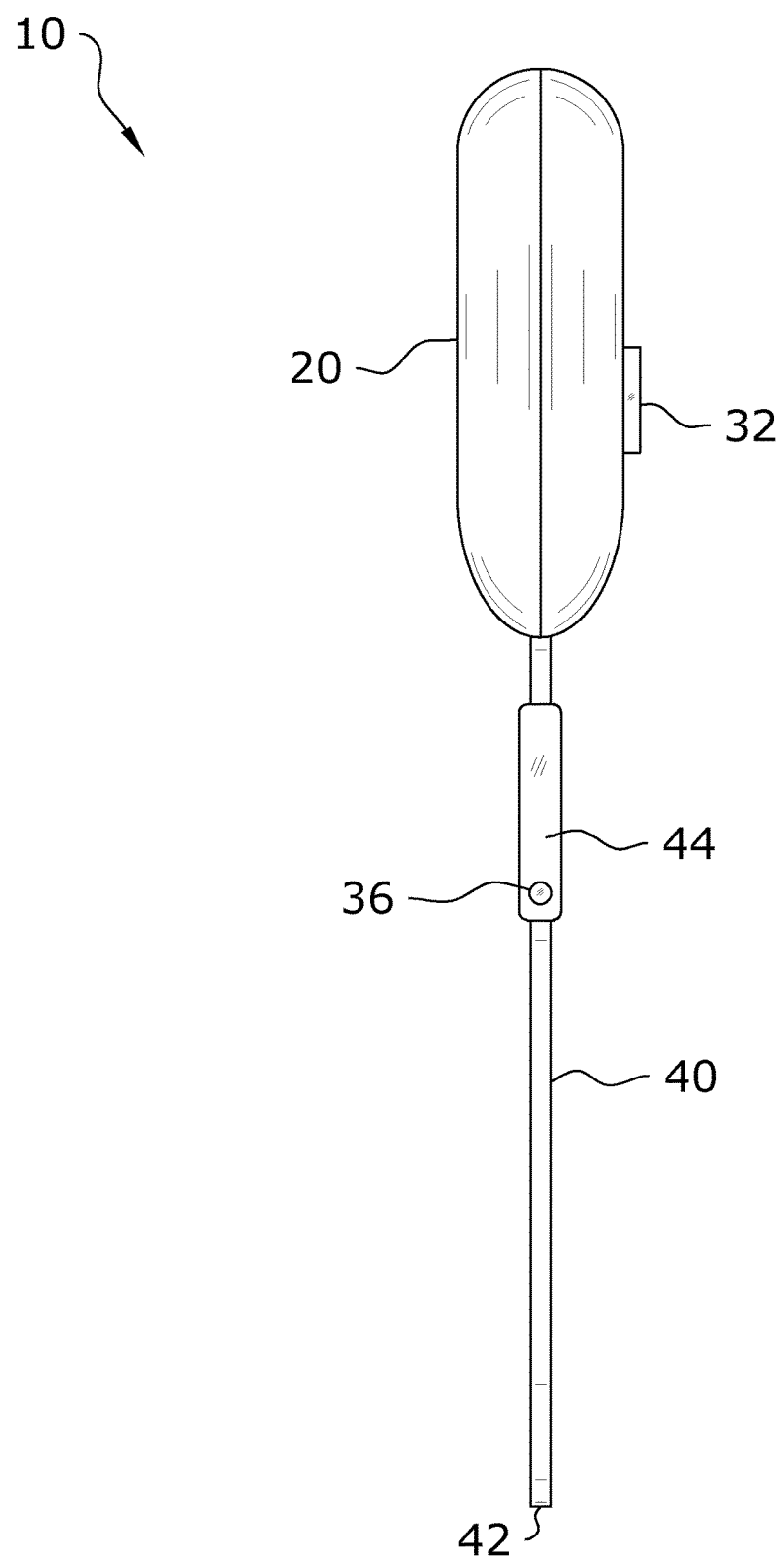
FIG. 7 is a top perspective view in accordance with embodiments of the present invention.

FIG. 7 is a top perspective view of the present invention. As shown FIG. 7, from this perspective, only the first prong (40) (with first gripping (44) and control button (36)), and first end (42)) and housing (20) (with display button (32)) are noticeable. Advantageously, the second prong (50) is unseen as it is located directly below first prong (40). Accordingly, first and second prongs (40, 50) are located on the same plane. From this design, the inventive device (10) can be properly calibrated and allow for exact measurement to take place during operation.

Advantageously, in embodiments, the control button (36) is located toward the far edge of first gripping (44). This further allows for comfort and efficient use by an operator, who while holding the first gripping (44)) with their right thumb finger, would not unintentionally press the control button (36). Because the control button is located at the far edge, the operator would only knowingly press the control button (36) during operation, and unintentional measurement is prevented.

Figure 8:
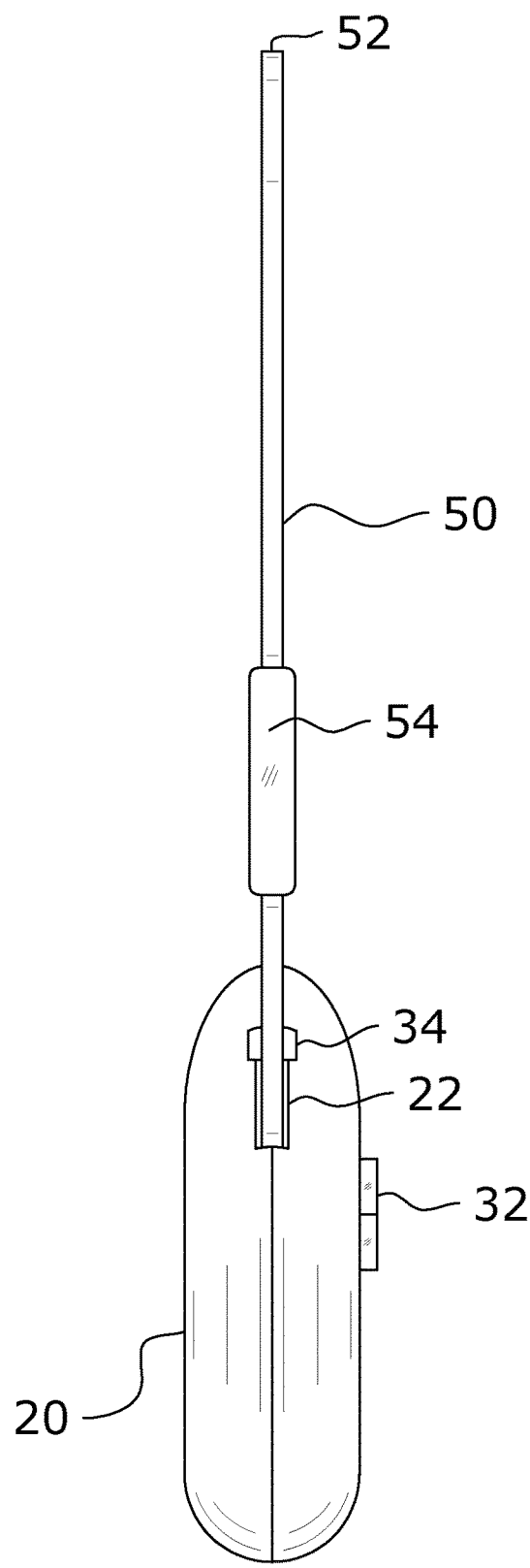
FIG. 8 is a bottom perspective view in accordance with embodiments of the present invention.

FIG. 8 is a bottom perspective view of the present invention. As shown in this perspective, only the second prong (50) (with second gripping (54) and second end (22)),
slot (22), light (34), and housing (20) (with display button (32)) are noticeable. Advantageously, the first prong (40) is unseen as it is located directly above second prong (50). Accordingly, first and second prongs (40, 50) are located on the same plane. From this design, the inventive device (10) can be properly calibrated and allow for exact measurement to take place during operation.

Figure 9:
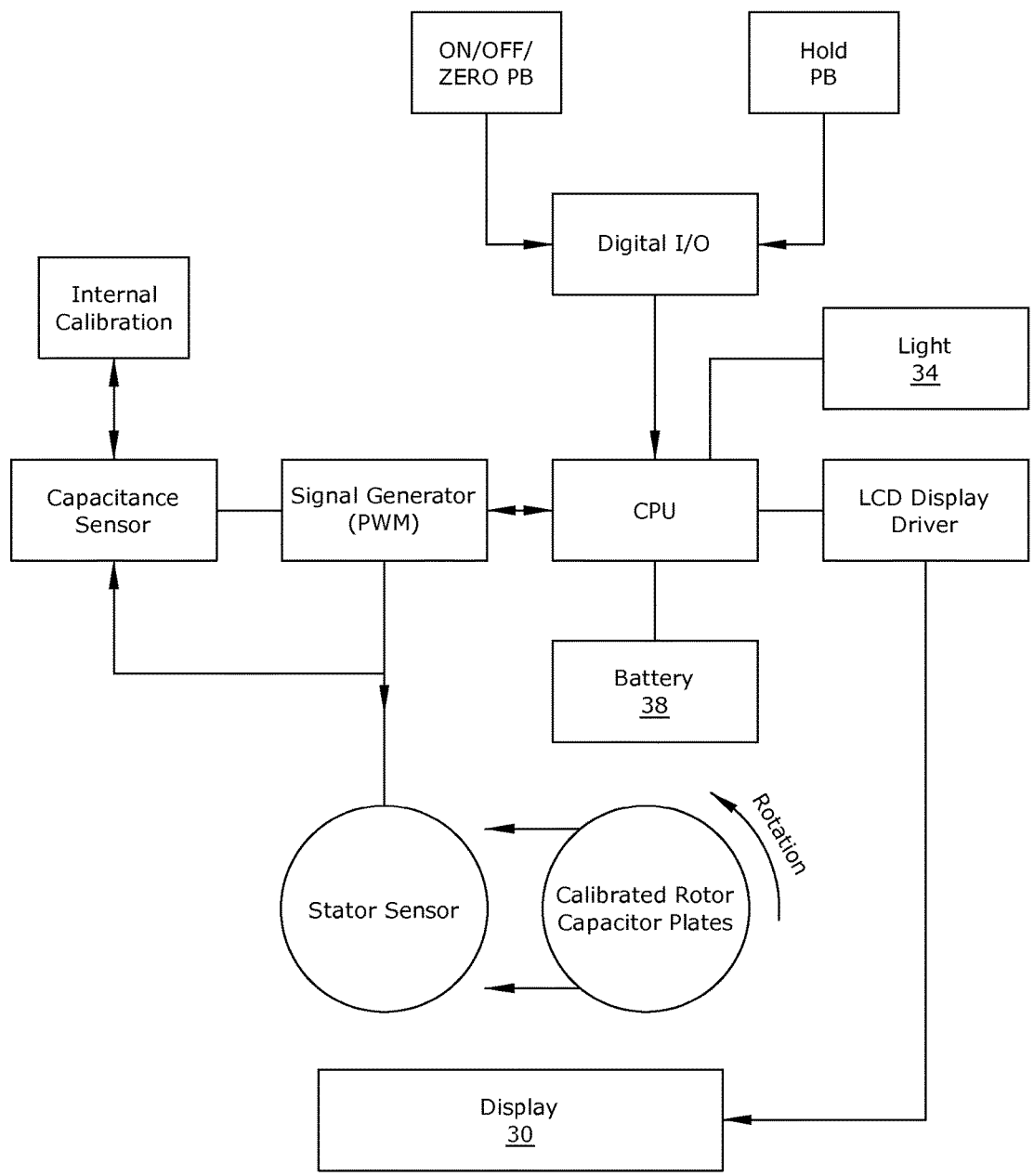
FIG. 9 includes an overview of the circuit diagram in accordance with embodiments of the present invention.

FIG. 9 includes an overview of an example portion of the circuit diagram of the present invention. The design components and or aspects include: internal calibration, a capacitance sensor, signal generator (PWM), stator sensor, calibration rotor capacitor plates, central processing unit (CPU) (or microprocessor), ON/OFF/ZERO PB (press button) for the display button (32), Hold/Measurement PB (press button) for the control button (36), digital input/output (I/O), LCD display driver, light (34), battery (38), and display (30).

In example embodiments, signals from the display button (32) (also known as ON/OFF/ZERO PB (press button)) and the control button (36) (also known as Hold/Measurement press button) are input to the digital input/output (I/O) and are subsequently connected to the CPU (or microprocessor). Also connected to the CPU are the generated PWM signals; which are provided from the internal calibration, capacitance sensor, stator sensor, and calibration rotor capacitor plates. Moreover, the CPU is connected to the light (34), the LCD display driver and the battery (38). For example, through the LCD display driver, the CPU is connected to the display unit (30).

Advantageously, the inventive device (10) utilizes a circular printed circuit board with calibrated rotor capacitive plates that are grouped and connected to the signal generator, which produces pulse with modulated (PWM) signals. In embodiments, the capacitive plates oppose the rotor's precise fabricated rotor plates; thus producing a varying capacitive effect. Accordingly, this allows the capacitive sensor to receive an approximate sine wave that peaks upon the separation and alignment of the rotor plates. Moreover, through finely fabricated printed circuit board vias, the proper connections for sensing are made.

As shown in FIG. 9, battery (38) powers the inventive device (10). In embodiments, battery (38) can directly power the inventive device (10) from a three volt battery.

Advantageously, in certain embodiments, the inventive wrench selector system (10) is made from ABS plastic. Accordingly, the inventive system can have an easy grip, is light weight, and is made from resilient material construction that is also abrasion resistant.

In operation, the product determines the proper wrench size to use based on the size of a fastener head (14). Advantageously, this allows for seamless work flow for a mechanic where guesswork is no longer necessary to determine the proper wrench.

Figure 10:
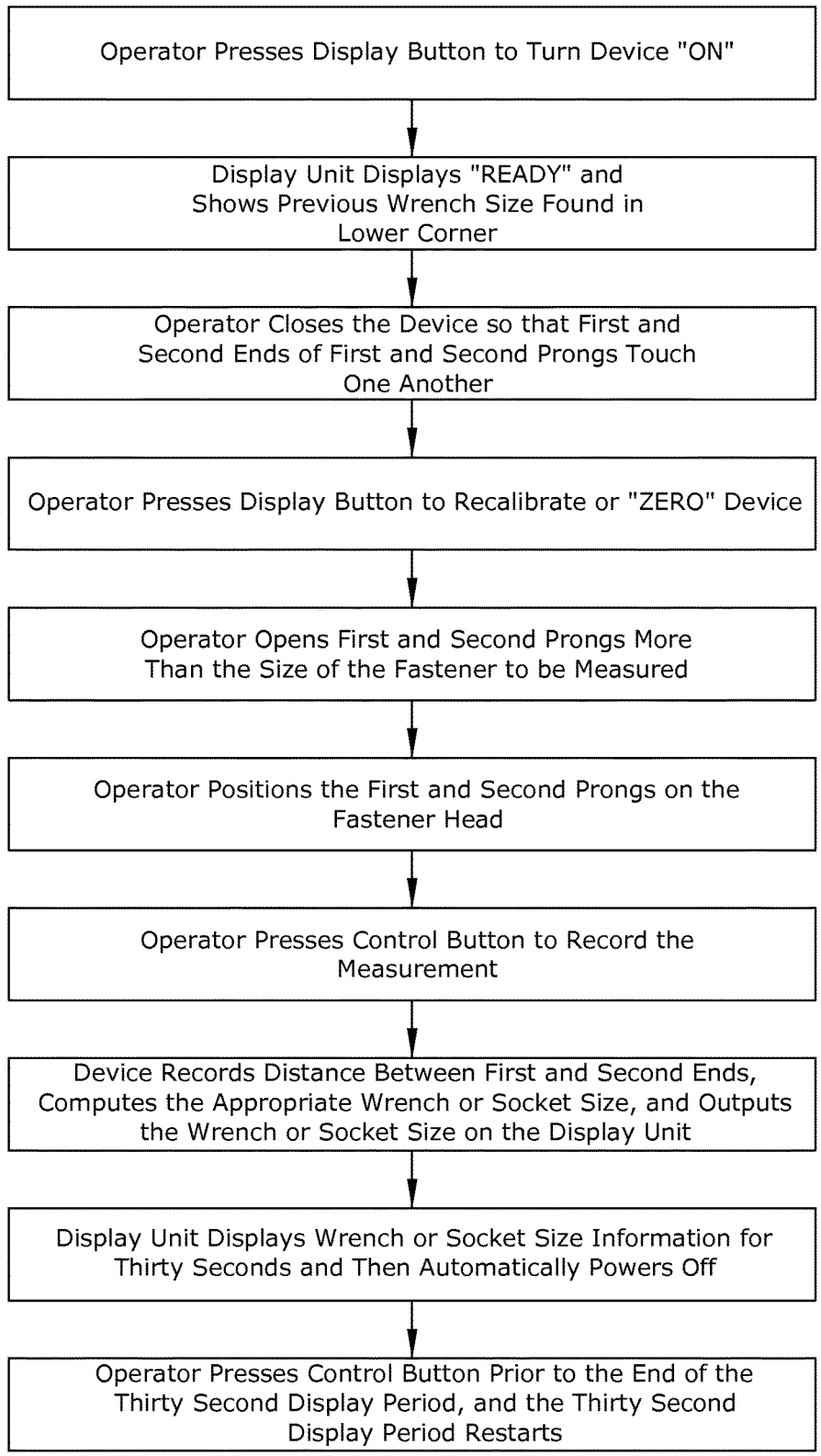
FIG. 10 shows a flow diagram in accordance with embodiments of the present invention.

FIG. 10 shows a flow diagram of an example operation of the present invention. As illustrated in FIG. 10, an example procedure of steps an operator would perform to use the inventive device (10) is shown.

In Step 1001, an operator picks up the inventive device (10) and presses the display button (32) to turn the device (10) "ON".

In Step 1002, the display unit (30) displays "Ready" and provides the last wrench size found in the lower corner. If in operation, the operator presses the "ON" display button (32), but does not move the first and second prongs (40, 50), the display unit (30) would display "Ready" for thirty seconds, and then subsequently the device (10) would power "OFF". Advantageously, software protocols of the inventive device (10) perform the appropriate logic operations to show the term "Ready" on the display unit (30) and provide the last wrench size found in the lower corner.

In Step 1003, the operator closes the device (10) so that first and second ends (42, 52) of first and second prongs, respectively (40, 50) are touching one another.

In Step 1004, the operator then presses the display button (32) to "ZERO" or recalibrate the inventive device (10).

In Step 1005, the operator opens the first and second prongs (40, 50) more than the size of the fastener (12) to be measured.

In Step 1006, the operator positions the prongs (40, 50) on the fastener head (14).

In Step 1007, with the first and second ends (42, 52) grasping the fastener (12), the operator presses the control button (36) to record the measurement. Advantageously, first and second ends (42, 52) allow for sensing capabilities through the connections established by the fabricated printed circuit board vias.

In Step 1008, the inventive device (10) internally records the distance between the first and second ends (42, 52), computes the proper wrench size and outputs the wrench size on the display unit (30). If for instance, the size measured is determined to be "close enough" to an example English or metric wrench, then the device displays both wrench sizes.

In Step 1009, the display unit (30) displays the wrench size information for thirty seconds and then the device (1) automatically powers "OFF".

In Step 1010, by pressing the control button (36) before the thirty seconds expires, the thirty second period will restart. Further, in operation, if the time period expires, the operator can restart the inventive device (10) by pressing the display button (32) and turning the device "ON".

Advantageously, software protocols of the inventive device (10) sense the momentary pushbutton of the display button (32) and perform the appropriate logic operations to concurrently power the inventive device (10) "ON" or "OFF", or "ZERO" (or recalibrate) the device (10).

Further, software protocols are utilized to sense the momentary pushbutton of the control button (36) and either initialize operation to take measurements of an example fastener (12) or "HOLD" the computed wrench size on the display unit (30) for an additional thirty seconds.

After the first and second ends (42, 52) grasp the fastener (12), and the operator presses the control button (36) to record measurement (as described in Step 1007 and FIG. 4), software protocols of the inventive device (10) instruct the device (10) to conduct measurements of the sine wave phase shift (received from the capacitive sensor) and determine measurements of the width of the fastener head or nut.

Next, software protocols of the inventive device (10) perform a wrench lookup from tables of data stored in the memory of the device, which can be any memory component as conventionally known in the art. For example, in an example embodiment, the software instructions can perform a wrench lookup from the example wrench conversion table of FIGS. 11a, 11b, 11c, 11d. In other embodiments, various different conversion tables of measurement and sizes as known in the art may be stored (or wirelessly obtained through the internet) and used instead or in conjunction with FIGS. 11a, 11b, 11c, 11d. After matching the recorded measurements to the appropriate wrench size, software instructions of the inventive device (10) display the wrench size information on the display unit (30).

In embodiments, advantageously, software protocols are also utilized to place the CPU (or microprocessor) in sleep mode when the device (10) is turned "OFF" by either the operator or by a time delay.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A wrench selector system, comprising:
a housing including a display unit and an opening;
a first prong extending outward from a perimeter of said housing in a fixed position;
a second prong protruding from said opening of said housing;
a first gripping and a second gripping, wherein said first gripping and said second gripping are adjoined to said first prong and said second prong respectively; and
a control button positioned on said first gripping to allow for computing a wrench size for at least one of a fastener head or nut,
wherein said wrench size is displayed on said display unit.

2. The wrench selector system of claim 1, wherein said first prong and said second prong include elongated and narrow proportions in comparison to said housing.

3. The wrench selector system of claim 1, wherein said first prong and said second prong extend from said opening of said housing at fixed and equivalent lengths.

4. The wrench selector system of claim 3, wherein said second prong extends from said perimeter of said housing in a varying position.

5. The wrench selector system of claim 1, wherein said first prong and said second prong include first and second ends, respectively.

6. The wrench selector system of claim 5, wherein said first end curves downward to form the top seizing element and said second end curves upward to form the bottom seizing element.

7. The wrench selector system of claim 1, wherein said opening is of a fixed size and substantially rectangular shaped.

8. The wrench selector system of claim 2, wherein said second prong protrudes from said opening and is slidably adjustable within said opening.

9. The wrench selector system of claim 1, wherein said housing includes a half curved circle and a half triangle shape.

10. The wrench selector system of claim 1, wherein said housing includes a display button adjacent to said display unit.

11. The wrench selector system of claim 1, wherein said computing includes: measuring of said at least one of said fastener head or nut and calculating a size of a corresponding wrench.

12. The wrench selector system of claim 11, wherein said display unit displays said corresponding wrench size in at least one of metric and English units.

13. The wrench selector system of claim 1, wherein said first gripping and said second gripping are located on outer portions of said first prong and said second prong respectively.

14. The wrench selector system of claim 1, wherein said first gripping and said second gripping at least partially wrap around a portion of first and second prongs, respectively.

15. The wrench selector system of claim 1, wherein said first prong is located on the same plane as said second prong.

16. The wrench selector system of claim 1, wherein said control button is located on an edge of said first gripping.

17. The wrench selector system of claim 1, wherein said housing includes a light located between said first prong and said second prong.

18. The wrench selector system of claim 1,
wherein when the first end contacts the second end, a display button, adjoined to the housing, is depressed to recalibrate the device, and
wherein when the fastener head or nut is grasped between the first and second ends, the control button is depressed to record a distance between the first and second ends to compute the wrench size.

19. A wrench selector system comprising:
a housing including a display unit and a fixed size rectangular opening;
a display button, adjoined to the housing and adjacent to the display unit, for turning on and off the display unit;
a first prong, including a control button, extending outward from a perimeter of the housing in a fixed position;
a second prong protruding from the rectangular opening of the housing and located below the first prong, wherein the second prong is able to slidably move upward and downward within the rectangular opening;
said first prong and said second prong including a first end and a second end, respectively;
a first gripping and a second gripping, wherein said first gripping and said second gripping are adjoined to said first prong and said second prong respectively;
said control button positioned on said first gripping to allow for computing a wrench size for at least one of a fastener head or nut,
wherein said wrench size is displayed on said display unit.

20. A wrench selector system, comprising:
a housing including a display unit and an opening;
a first prong extending outward from a perimeter of said housing in a fixed position;
a second prong protruding from said opening;
a first gripping and a second gripping, wherein said first gripping and said second gripping are adjoined to said first prong and said second prong respectively; and
a control button positioned on said first gripping to allow for computing a wrench size for at least one of a fastener head or nut,
wherein said first prong and said second prong include a first end and a second end, respectively,
wherein said first end contacts said second end to calibrate the selector system prior to computing the wrench size, and
wherein said wrench size is displayed on said display unit.

* * * * *